United States Patent [19]

Parker et al.

[11] Patent Number: 5,190,991
[45] Date of Patent: Mar. 2, 1993

[54] BRAKE LININGS

[75] Inventors: Euan Parker; Bruno Grele, both of Smithville, Tenn.

[73] Assignee: Nuturn Corporation, Nashville, Tenn.

[21] Appl. No.: 607,728

[22] Filed: Nov. 1, 1990

[51] Int. Cl.⁵ .................... C08J 5/14; C08K 7/02
[52] U.S. Cl. .................... 523/149; 523/153; 523/157; 523/155; 523/156; 264/86; 264/87; 264/295
[58] Field of Search .......... 523/149, 153, 157; 264/86, 295

[56] References Cited

U.S. PATENT DOCUMENTS

| | | |
|---|---|---|
| 2,611,727 | 10/1949 | Underwood et al. ............ 523/157 |
| 4,617,162 | 10/1986 | von Rex et al. ............ 523/149 |
| 4,775,705 | 10/1988 | Parker et al. ............ 523/156 |
| 4,861,809 | 8/1989 | Ogawa et al. ............ 523/149 |
| 4,866,107 | 9/1989 | Doxsee et al. ............ 523/153 |

Primary Examiner—Paul R. Michl
Assistant Examiner—Andrew E. C. Merriam
Attorney, Agent, or Firm—Nixon & Vanderhye

[57] ABSTRACT

A brake lining is made from a preform which has been formed by a compression step parallel to that surface of the brake lining preform which is to be the braking surface of the lining in use and has subsequently been compressed in a direction substantially normal to said surface to form the lining. The preform can be made by dewatering an aqueous slurry of the brake lining ingredients prior to the first compression step.

1 Claim, 2 Drawing Sheets

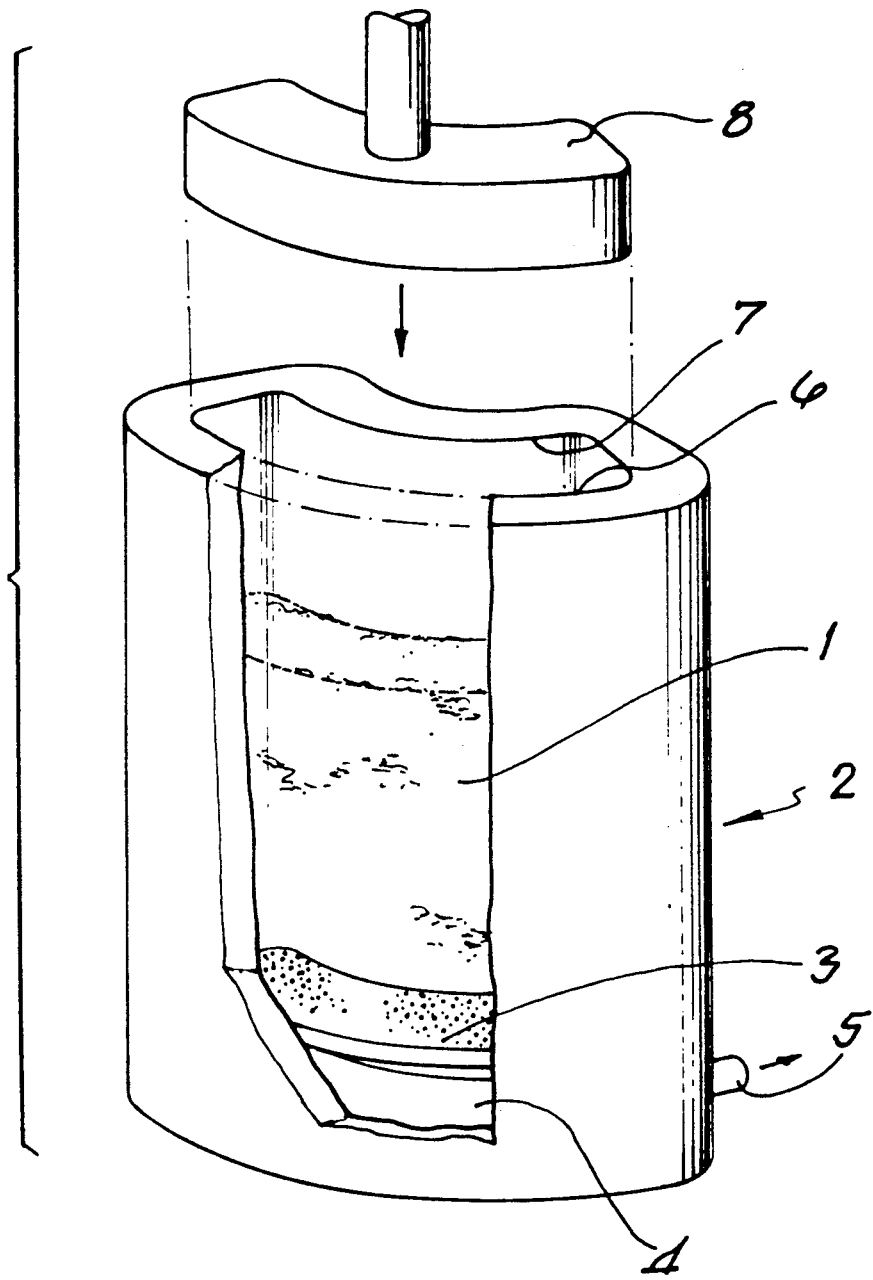

BRAKE LININGS

BACKGROUND OF THE INVENTION

This invention relates to brake linings, and in particular to brake linings made by a novel method of manufacture.

In U.S. Pat. No. 4,656,203 there is described a friction material having a high void content, the preform for which is made by a slurry technique, and in U.S. Pat. No. 4,775,705, which is a continuation in part of the former patent, there is described the manufacture of brake pads containing high proportions of fibre and a higher void content than usual, again the method of making a preform being a slurry technique.

We have now found that in the manufacture of brake linings the slurry technique as described hitherto produced unsatisfactory results with uneven distribution of ingredients because of the curved profile of the lining which is needed. It is an alternative to produce a flat sheet of material by the slurry technique and then mold this to the desired curved shape but this adds an additional process step, which is expensive.

Thus it is an object of this invention to provide a method of making brake linings by means of a slurry preforming technique.

It is another object of the invention to provide a novel brake lining which is produced from a preform made by the aforementioned slurry preforming technique.

SUMMARY OF THE INVENTION

According to the present invention a method for the manufacture of a curved brake lining comprises the following steps a) mixing the ingredients of a composition for the lining into a slurry in water, b) supplying said slurry to a mold, at least the base of which is permeable to water, the mold cavity having sides which are curved so as to give the cavity the shape of a thick brake lining on its side, c) dewatering the slurry, d) applying pressure to the mixture in the mold by means of a curved punch acting in a direction perpendicular to the mold base and parallel to said curved walls to form a preform, e) extracting the preform from said mold and drying off excess water, f) placing the preform into a further mold with a curved base and applying pressure to the preform with a curved punch, to compress the preform in a direction perpendicular to the direction of the pressure applied during preforming and produce a brake lining of a desired thickness, g) heating the molded product to cure the brake lining composition.

It will be appreciated that during conventional friction material manufacture preforming is carried out under pressure which is applied in the same direction as the final molding pressure. In the novel method of this invention, the pressure applied during preforming is in a transverse direction, at right angles to the direction of the final molding pressure. This gives rise to advantageous additional consolidation of the brake lining material.

The invention thus also provides brake linings made from preforms in which the preform has been formed by a compression step parallel to the surface of the brake lining preform which is to be the braking surface of the lining in use, and has subsequently been compressed in a direction substantially normal to said surface to form said lining.

The brake linings of this invention comprise fibres, thermosetting organic binder, and optionally fillers and friction and wear modifiers. (These latter ingredients are generally particulate materials.)

The fibres used for the brake lining include a web-forming fibre to facilitate satisfactory deposition of the material composition from a slurry, and possible web-formers include cellulose fibres and synthetic organic pulp fibres such as those obtainable in polyacrylonitrile and polypropylene.

The preferred web-forming fibre is, however, aramid pulp fibre.

The total amount of fibre in the composition of the friction material of the brake lining may be from 17% to 60% by volume of the composition, and preferably is in the range 20% to 45% by volume. Of this, at least some of the fibre is web-forming fibre and the amount of web-forming fibre in the composition may be 8% to 40% by volume of the composition, preferably 12% to 40% by volume.

Where a non-web-forming fibre is used, and it is not essential to use one particularly when the web-former is a heat resistant fibre such as aramid fibre, the fibre may be chosen from a wide range of fibres such as metal fibres, e.g. steel wire, brass wire, carbon fibre, inorganic fibres such as glass, mineral wool, ceramic fibre, and organic fibres such as aramid, polyacrylonitrile etc.

The binder material is preferably based on binder polymers usual for use in brake linings. These binders are well-known in the art and include resins based on phenol and formaldehyde and related resins, and rubbers such as nitrile rubbers, natural rubber and styrene-butadiene rubber. Mixtures of resin and rubber may be used, the particular combination of polymers chosen depending upon the manufacturing characteristics desired and properties wanted in the finished brake linings. Amounts of binder polymers of at least 15 percent by volume up to as much as 40 percent by volume may be used in the brake linings, these figures being percent by volume of total solids in the finished product and ignoring volume of voids in the product. Preferably the amount of binder falls in the range of about 25 to about 30 percent by volume total solids.

Friction and wear modifiers and fillers of the usual types may be employed, examples of such materials being carbon black, graphite, talc, barytes, polymerized cashew nut shell resin particles, and metal powders, e.g., brass, copper and alumina alloys, metallic sulphides, metallic oxides, vermiculite. When present such modifiers are incorporated in the range of about 15 percent to about 30 percent by volume of total solids.

With respect to finished brake linings the actual density of the brake lining material will normally be less than the theoretical density of the material and preferably the density is at least about 12 percent less than theoretical. We have found that with reducing actual density there is improvement in high temperature fade resistance but some increase in wear. At actual densities of about 60 percent theoretical and below, structural integrity is apt to suffer and the lining is unsuitable for its intended purpose. Preferably the actual density of the brake lining is greater than 65 percent of theoretical and it is particularly preferred that the actual density is in a range of about 75 percent to 88 percent of theoretical density. One skilled in the manufacture of friction products will have no difficulty in empirically selecting the appropriate density having regard to the formulation used, the pressing/heating conditions employed, and the intended use of the product.

It has been found that non-asbestos brake linings of the present invention using the compositions outlined above may achieve significant increases in fade resistance when compared with non-asbestos linings made by conventional techniques. The brake linings are useful as drum brake linings in automobiles.

BRIEF DESCRIPTION OF THE DRAWINGS

The process of the invention will now be described in more detail, by way of example only, with reference to the accompanying drawings in which:

FIG. 1 is a schematic diagram illustrating the process used to make a brake lining preform in this invention, FIG. 1a is an elevated perspective view of a preform brake lining produced by the process illustrated in FIG. 1.

DETAILED DESCRIPTION OF THE INVENTION

Figure 2:
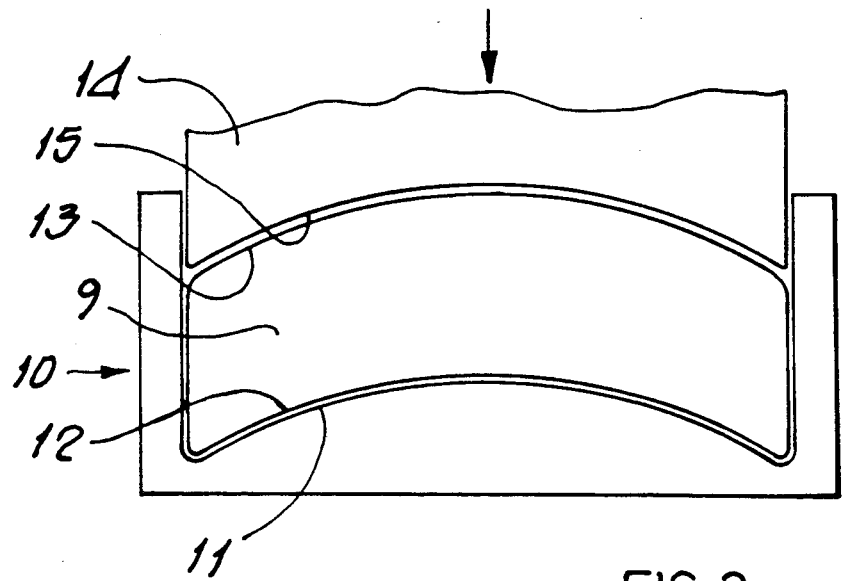
FIG. 2 is a schematic diagram illustrating the process used to convert a preform into a brake lining and FIG. 2a is a side view of a green brake lining produced by the process of FIG. 2.

A slurry in water of the ingredients of the brake lining formulation to be used is prepared in a mixer. A measured amount of slurry 1 is fed into a mold 2 as shown in FIG. 1. The mold 2 has a wall 3 which is permeable to water below which is a cavity 4 with an outlet 5 through which water may be drawn away.

The walls 6 and 7 of the mold cavity are curved so that the mold 2 will enable a brake lining preform to be produced on its side.

When the slurry 1 has been charged to the mold 2 the mold is closed by a plunger 8 to which pressure is then applied. Suction may also be applied to the outlet 5 to assist in water removal. The pressure applied at this stage in the process need not be great since the objective is to produce a handleable preform. Preferred pressure is about 0.25 tonnes/m$^2$.

It will be noted that in this process step the compressive force of the plunger 8 is acting in a direction parallel to mold walls 6 and 7 and hence parallel to the surface of the brake lining preform (against mold wall 6) which will become the braking surface of the lining when in use.

The preform 9 produced is illustrated in FIG. 1A and is still relatively wet so must be dried e.g. in warm air at a temperature of about 68° C.

Once dry the preform 9 is ready to be molded into a brake lining. It is thus turned through 90° from its orientation in the preform mold and is inserted in a die 10 with an upwardly convex bottom wall 11 so that the concave surface 12 of the preform 9 rests against the convex bottom wall 11. The die is then closed under pressure by a punch 14 having a concave bottom face 15 which bears on the convex surface 13 of the brake lining preform. The brake lining is consolidated to its final density under the high pressure used. The pressure used in this phase is much higher, being about 15 tonnes/in$^2$ and the temperature is in the range from room temperature to 30° C.

Finally the green brake lining 16 (illustrated in FIG. 2A) is removed from the mold and is baked, preferably in a lining pack (between lunettes) or on a drum, under a clamping pressure of 200 to 400 psi at 350° F. to 425° F. for several hours then ground to give a finished product 17.

Figure 3:
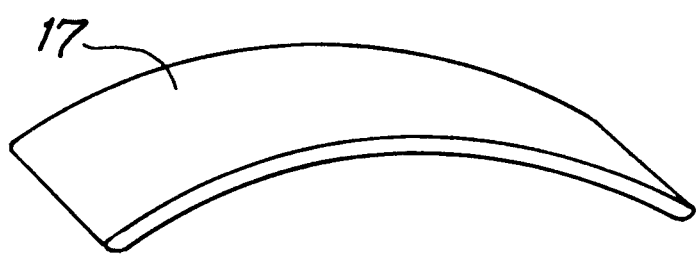
FIG. 3 is a perspective view of a finished brake lining.

It should be noted that if the brake lining is to be bonded to a brake shoe the baking step can be omitted and the lining cured in situ on the shoe with the glue used for bonding the lining on to the shoe. In this case the lining is cured with the glue at 395° F. to 425° F. over a period of 25 minutes or more. During this period the lining is clamped on the shoe in a manner conventional for bonding of linings to shoes. The finished cured brake lining 17 (FIG. 3) is removed from the lining pack, ground and drilled as necessary in the conventional way.

If desired, during the manufacturing process described above the preform may be scorched after it has been dried. In this case the lining preform 9 is dried (to below 3% moisture) and its surface is scorched by means of a gas flame for several seconds.

The invention will now be further illustrated by means of a detailed example.

EXAMPLE 1

Non-asbestos brake linings were made from the composition given below in Table 1.

TABLE 1

| Ingredients | Parts by volume |
|---|---|
| Nitrile rubber latex | 20 |
| Phenolic resin (powder) | 10 |
| Sulphur | 5 |
| Aromatic polyamide pulp (KEVLAR; 6 mm) | 20 |
| Ceramic fibre | 10 |
| Mineral wool | 15 |
| Fillers & Friction & Wear Modifiers | 20 |

The ingredients were mixed in water to form a slurry with a solids content of about 10 percent by weight. Slurry was fed into a mold of the kind illustrated in FIG. 1, with a water permeable wall, and water removed under a pressure of about 0.25 tonnes/in$^2$ to form a wet preform whose depth was slightly less than the width of the brake lining to be molded from it.

The preform was dried at about 70° C. to below 3% moisture and its surface was scorched in a gas flame.

Figure 2A:

The scorched preform was then loaded into a press-forming mold of the kind illustrated in FIG. 2, with the concave face of the preform facing downwards. It was then molded to final density under a pressure of 15 tonnes/in$^2$, the tool temperature being 25° C. The width of the mold was the desired finished lining width, the preform having been made slightly smaller than this to facilitate easy loading into the press-forming mold. The green lining so formed was removed from the mold, clamped for baking between lunettes at a pressure of 200 to 400 psi and baked for 4 hours in an oven at 400° F.

The lining was then removed from the oven, ground and drilled. The finished lining had an actual density 80% of theoretical density, a friction coefficient of 0.38 and good fade and wear resistance.

It was noted that the brake lining produced did not have the laminar structure, (with strata parallel to the working surface) which is usual in products produced from slurry preforms. It is believed that the consolidation resulting from the two compression stages in perpendicular directions had resulted in a greater consolidation of the structure than the usual.

We claim:

1. A method for the manufacture of a curved brake lining which comprises the following successive steps:
   (a) mixing the ingredients of a composition for the brake lining into a slurry in water, the slurry composition consisting essentially of fibers, binder polymer and particulate materials in which the amount of fiber is in the range of 17% to 60% by volume of the composition of the lining and the fibers include web-forming fibers in the range 8% to 40% by volume of the composition,
   (b) supplying said slurry to a mold, at least the base of which is permeable to water, the mold cavity having sides which are curved so as to give the cavity the shape of a thick brake lining on its side,
   (c) dewatering the slurry,
   (d) applying pressure to the mixture in the mold by means of a curved punch acting in a direction perpendicular to the mold base and parallel to said curved walls to form a preform having two substantially parallel upper and lower faces, a curved surface which is to become the curved braking surface of the lining in use, and a curved back surface,
   (e) extracting the preform from said mold and drying off excess water,
   (f) placing the preform into a further mold with a curved base and applying pressure to the preform with a curved punch, to cold form and compress the preform in a direction perpendicular to the direction of the pressure applied during preforming and produce a curved brake lining of a desired thickness.
   (g) removing the curved brake lining from the mold, and
   (h) heating the molded product to cure the brake lining composition.

* * * * *